(12) United States Patent
Hahn et al.

(10) Patent No.: US 9,622,151 B2
(45) Date of Patent: Apr. 11, 2017

(54) METHOD FOR MANAGING INFORMATION ABOUT ON/OFF SMALL CELLS IN RADIO ACCESS SYSTEM AND APPARATUS FOR SUPPORTING SAME

(71) Applicant: LG ELECTRONICS INC., Seoul (KR)

(72) Inventors: Genebeck Hahn, Seoul (KR); Jaehoon Chung, Seoul (KR); Hyeyoung Choi, Seoul (KR); Eunjong Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/775,525

(22) PCT Filed: Mar. 10, 2014

(86) PCT No.: PCT/KR2014/001945
§ 371 (c)(1),
(2) Date: Sep. 11, 2015

(87) PCT Pub. No.: WO2014/142487
PCT Pub. Date: Sep. 18, 2014

(65) Prior Publication Data
US 2016/0044576 A1 Feb. 11, 2016

Related U.S. Application Data

(60) Provisional application No. 61/778,483, filed on Mar. 13, 2013, provisional application No. 61/806,404, filed on Mar. 29, 2013.

(51) Int. Cl.
*H04W 48/08* (2009.01)
*H04L 5/00* (2006.01)
(Continued)

(52) U.S. Cl.
CPC .......... *H04W 48/08* (2013.01); *H04W 16/08* (2013.01); *H04W 52/0206* (2013.01); *H04W 24/02* (2013.01); *H04W 84/045* (2013.01)

(58) Field of Classification Search
CPC ..... H04W 48/08; H04W 52/02; H04W 16/04; H04W 72/08; H04W 72/0446;
(Continued)

(56) References Cited

U.S. PATENT DOCUMENTS 8,843,129 B2 * 9/2014 Li ..................... H04W 36/0061
370/328
9,369,933 B2 * 6/2016 Hong ..................... H04W 24/02
(Continued)

FOREIGN PATENT DOCUMENTS

JP 2012-195828 10/2012
KR 10-2010-0105495 9/2010
(Continued)

OTHER PUBLICATIONS

PCT International Application No. PCT/KR2014/001945, Written Opinion of the International Searching Authority dated Jun. 16, 2014, 22 pages.

*Primary Examiner* — Khawar Iqbal
(74) *Attorney, Agent, or Firm* — Lee Hong Degerman Kang Waimey

(57) ABSTRACT

The present invention relates to a method for managing information of on/off small cells in a small cell-based network system and apparatuses for supporting the same. As an embodiment of the present invention, a method for managing information on on/off small cells in a radio access system supporting small cells comprises the steps of: receiving a first message including cell state change information of a first cell corresponding to a small cell, which is changed to an on state or an off state, by a second cell; and transmitting a second message including the cell state (Continued)

change information to a UE by the second cell. At this time, the cell state change information may contain identification information of the first cell, on/off time information indicating a time when change to an on state or an off state is made, and on/off timer information indicating a time interval in which the change to the on state or the off state is made.

6 Claims, 11 Drawing Sheets

(51) Int. Cl.
  *H04W 52/02* (2009.01)
  *H04W 16/08* (2009.01)
  H04W 84/04 (2009.01)
  H04W 24/02 (2009.01)

(58) Field of Classification Search
  CPC .... H04W 74/0816; H04B 7/04; H04L 5/0007; H04L 5/0051; H04L 1/1614; H04L 5/0073; H04L 5/0048; H04L 5/0098
  USPC .......................... 455/412.1–414.4, 456, 444
  See application file for complete search history.

(56) References Cited

U.S. PATENT DOCUMENTS

| | | | | |
|---|---|---|---|---|
| 9,391,759 | B2* | 7/2016 | Zhu | H04L 5/0092 |
| 2012/0142328 | A1* | 6/2012 | Awoniyi | H04W 36/22 455/418 |
| 2013/0303219 | A1* | 11/2013 | Acharya | H04B 7/0632 455/509 |
| 2013/0303220 | A1* | 11/2013 | Acharya | H04B 7/024 455/509 |
| 2015/0003310 | A1* | 1/2015 | Ko | H04W 52/0274 370/311 |
| 2015/0071241 | A1* | 3/2015 | Yoon | H04W 72/0446 370/329 |
| 2015/0131604 | A1* | 5/2015 | Hammarwall | H04L 1/0026 370/330 |
| 2015/0282080 | A1* | 10/2015 | Maattanen | H04W 52/0216 370/311 |
| 2016/0007211 | A1* | 1/2016 | Mochizuki | H04W 16/08 455/449 |
| 2016/0066255 | A1* | 3/2016 | Marinier | H04W 48/16 370/350 |
| 2016/0157187 | A1* | 6/2016 | Zhu | H04W 52/243 370/311 |

FOREIGN PATENT DOCUMENTS

| | | |
|---|---|---|
| KR | 10-2011-0019330 | 2/2011 |
| KR | 1020110023726 | 3/2011 |
| KR | 10-2011-0051969 | 5/2011 |
| KR | 10-2012-0015255 | 2/2012 |
| KR | 1020120119826 | 10/2012 |

\* cited by examiner

METHOD FOR MANAGING INFORMATION ABOUT ON/OFF SMALL CELLS IN RADIO ACCESS SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2014/001945, filed on Mar. 10, 2014, which claims the benefit of U.S. Provisional Application No. 61/778,483, filed on Mar. 13, 2013 and 61/806,404, filed on Mar. 29, 2013, the contents of which are all hereby incorporated by reference herein in their entirety.

TECHNICAL FIELD

The present invention relates to a wireless access system, and more particularly, to a method for managing information on an on/off small cell in a small cell-based network system and an apparatus thereof.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Recently, a wireless access network configuration has been changed such that various types of small cells having small sizes such as a pico cell, a femto cell, etc. interact with a macro cell having a relatively large size. The wireless access network configuration aims to provide a high data rate to final UEs and thus increase Quality of Experience (QoE) for the final UEs in a situation where multi-layer cells co-exist in a hierarchical structure basically involving a macro cell.

According to one of the current $3^{rd}$ Generation Partnership Project (3GPP) standardization categories, Small Cell Enhancements for E-UTRA and E-UTRAN SI; e.g., RP-122033, enhancement of indoor/outdoor scenarios using low-power nodes is discussed under the title of small cell enhancement. In addition, scenarios and requirements for the small cell enhancement are described in 3GPP TR 36.932.

In consideration of the aforementioned trend, final UEs will be more closely positioned at a network in a physical manner in the future in a manner of arranging many numbers of small cells to the inside of a macro cell. Hence, it is expected that communication via a UE-centered zone is enabled instead of a legacy physical cell-based communication in a next generation wireless access network. In order to perform the communication via the UE-centered zone for enhancing capacity, it is necessary to deduct technical issues for implementing such a service provision unit as the UE-centered zone, which is differentiated from such a service provision unit as a physical cell, and solve the technical issues.

And, appearance of the small cell may have a strong influence on a current RAN (remote area network). In particular, in the aspect of energy saving, on/off characteristic of the small cell may have an influence on deployment of a macro cell.

DISCLOSURE OF THE INVENTION

Technical Tasks

Accordingly, the present invention is directed to solve the aforementioned general technical problems. One object of the present invention is to provide a method of efficiently managing a small cell.

Another object of the present invention is to utilize information on small cells of which an on/off (on or off, hereinafter on/off) state is changing in a neighbor cell in a manner of transmitting the information on the small cells of which the state is changing to the neighbor cell.

Another object of the present invention is to make a UE efficiently perform a cell measurement process in consideration of an on/off small cell in a manner of transmitting state information on on/off small cells to the UE.

The other object of the present invention is to provide an apparatus supporting the aforementioned methods.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In order to solve the aforementioned technical tasks, the present invention provides a method of managing information on an on/off small cell in a small cell-based network system and apparatuses therefor.

To achieve these and other advantages and in accordance with the purpose of the present invention, as embodied and broadly described, according to one embodiment, a method of managing information on an on/off small cell in a wireless access system supporting a small cell can include the steps of receiving a first message including cell state change information on a first cell corresponding to a small cell changing to an on state or an off state from a second cell and transmitting a second message including the cell state change information, which is transmitted by the second cell, to a UE. In this case, the cell state change information can include identifier information on the first cell, on/off time information indicating time for changing to the on state or the off state and on/off timer information indicating a time interval of changing to the on state or the off state.

To further achieve these and other advantages and in accordance with the purpose of the present invention, as embodied and broadly described, according to a different embodiment, a second eNB managing information on an on/off small cell in a wireless access system supporting a small cell can include a transmitter, a receiver and a processor configured to manage the information on the on/off small cell.

In this case, the processor is configured to control the receiver to receive a first message including cell state change information on a first cell corresponding to a small cell changing to an on state or an off state and is configured to control the transmitter to transmit a second message including the cell state change information to a UE. In this case, the cell state change information can include identifier information on the first cell, on/off time information indicating time for changing to the on state or the off state and on/off timer information indicating a time interval of changing to the on state or the off state.

The cell state change information can further include identifier information on a third cell that reduces or expands coverage of the third cell as the first cell changes to the on state or the off state.

And, the cell state change information can further include period information indicating a period of the first cell changing to the on state or the off state.

The second message may correspond to either a MAC (medium access control) message or an RRC (radio resource control) message.

To further achieve these and other advantages and in accordance with the purpose of the present invention, as embodied and broadly described, according to a further different embodiment, a method of managing information on an on/off small cell in a wireless access system supporting a small cell can include the steps of receiving a first message, which is received by a UE, including cell state change information on a first cell corresponding to a small cell changing to an on state or an off state from a second cell and determining whether to perform a channel measurement procedure on the first cell, which is determined by the UE, based on the cell state change information. In this case, if the cell state change information indicates that the first cell is turned off, the UE can be configured not to perform the channel measurement procedure on the first cell. If the cell state change information indicates that the first cell is turned on, the UE can be configured to perform the channel measurement procedure on the first cell.

To further achieve these and other advantages and in accordance with the purpose of the present invention, as embodied and broadly described, according to a further different embodiment, a UE managing information on an on/off small cell in a wireless access system supporting a small cell can include a transmitter, a receiver and a processor configured to manage information on the on/off small cell.

In this case, the processor is configured to control the receiver to receive a first message including cell state change information on a first cell corresponding to a small cell changing to an on state or an off state from a second cell and is configured to determine whether to perform a channel measurement procedure on the first cell based on the cell state change information. In this case, if the cell state change information indicates that the first cell is turned off, the processor is configured not to perform the channel measurement procedure on the first cell. If the cell state change information indicates that the first cell is turned on, the processor is configured to perform the channel measurement procedure on the first cell.

In this case, the cell state change information can include identifier information on the first cell, on/off time information indicating time for changing to the on state or the off state and on/off timer information indicating a time interval of changing to the on state or the off state.

And, the cell state change information can further include identifier information on a third cell that reduces or expands coverage of the third cell as the first cell changes to the on state or the off state.

And, the cell state change information can further include period information indicating a period of the first cell changing to the on state or the off state.

The second message may correspond to either a MAC (medium access control) message or an RRC (radio resource control) message.

The aforementioned embodiments of the present invention are just a part of preferred embodiments of the present invention. Various embodiments to which technical characteristics of the present invention are reflected can be deducted and understood by those skilled in the art based on detail description of the present invention described in the following.

Advantageous Effects

Accordingly, the present invention provides the following effects or advantages.

First of all, it is able to efficiently manage power of a small cell in a small cell environment in which on/off small cells configured to turn on or off cell power exist in a manner of being mixed.

Secondly, it is able to utilize information on small cells of which an on/off state is changing in a neighbor cell in a manner of transmitting the information on the small cells of which the state is changing to the neighbor cell.

Thirdly, it is able to make a UE efficiently perform a cell measurement process in consideration of an on/off small cell in a manner of transmitting state change information on on/off small cells to the UE and minimize power consumption.

Effects obtainable from the present invention may be non-limited by the above mentioned effect. And, other unmentioned effects can be clearly deducted and understood from the following description by those having ordinary skill in the technical field to which the present invention pertains. In particular, unintended effects according to the present invention can also be deducted from the embodiments of the present invention by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Mode for Invention

Figure 1:
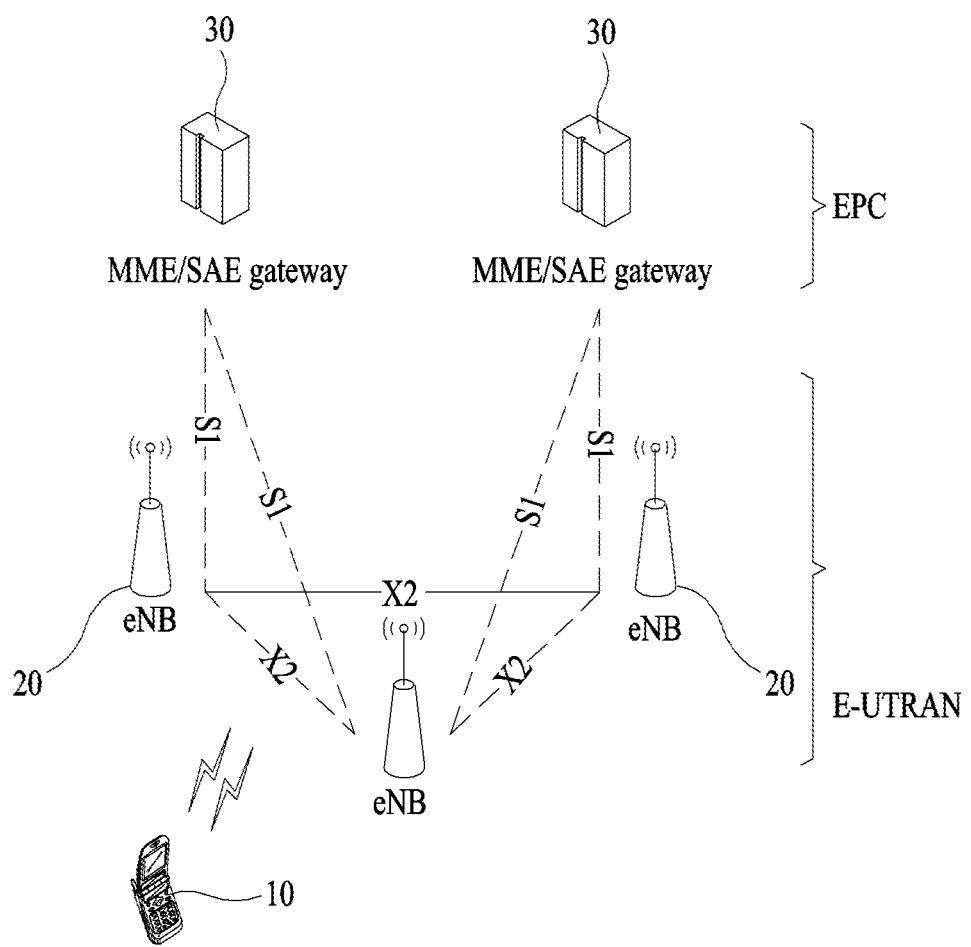
FIG. 1 is a block diagram for a network structure of an Evolved-Universal Mobile Telecommunication System (E-UMTS)

Embodiments of the present invention provide a method of managing information on an on/off small cell in a small cell-based network system and apparatuses therefor.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, an', and 'the' include plural referents unless the context clearly dictates otherwise.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). The UMTS is a 3rd Generation (3G) asynchronous mobile communication system operating in Europe system-based Wideband CDMA (WCDMA), GSM, and GPRS. 3rd Generation Partnership Project Long Term Evolution (3GPP LTE) is a part of Evolved UMTS (E-UMTS) using E-UTRA, adopting OFDMA for DL and SC-FDMA for UL. LTE-Advanced (LTE-A) is an evolution of 3GPP LTE.

While embodiments of the present invention are described in the context of a 3GPP LTE/LTE-A system in order to clarify the technical features of the present invention, the technical features of the present invention are not limited to the specific system. The following detailed description includes specific terms in order to provide a thorough understanding of the present invention. However, it will be apparent to those skilled in the art that the specific terms may be replaced with other terms without departing the technical spirit and scope of the present invention.

Embodiments of the present invention are provided to enable UE-based zone configuration beyond conventional physical cell-based connectivity. In the embodiments of the present invention, a UE-based zone is referred to as a 'UE zone'. To configure a UE zone, a UE may request UE zone configuration by transmitting information about a macro cell or a small cell to which the UE wants to be kept connected to the macro cell or the small cell. In embodiments of the present invention, a UE zone may be formed by maintaining a plurality of connections to two or more cells through network attachment procedures by a UE.

A 'cell' described in the embodiments of the present invention can be basically configured by a combination of downlink resources and uplink resources. In this case, a linkage between a carrier frequency for the downlink resources and a carrier frequency for the uplink resources is specified in system information (SI) delivered to the downlink resources.

In the following, 3GPP LTE/LTE-A system is explained as an example of a wireless access system to which the embodiments of the present invention are applicable.

1. 3GPP LTE/LTE-A Network Configuration 1.1 Network Structure of the LTE/LTE-A

The following description will be given of a network configuration available to a 3GPP LTE/LTE-A system to which embodiments of the present invention are applicable.

FIG. 1 illustrates a network configuration of an E-UMTS.

The E-UMTS is also called an LTE system. A communication network is deployed over a wide area and provides various communication services such as voice, Voice over Internet Protocol (VoIP) over IP Multimedia Subsystem (IMS), and packet data.

Referring to FIG. 1, an E-UMTS network includes an Evolved-UMTS Terrestrial Radio Access Network (E-UTRAN), an Evolved Packet Core (EPC), and one or more UEs. The E-UTRAN may include one or more eNBs 20 and one or more UEs 10 may be located within one cell. One or more E-UTRAN Mobility Management Entity (MME)/System Architecture Evolution (SAE) GateWays (GWs) 30 may be located at an end of the network and connected to an external network.

An eNB 20 provides user-plane and control-plane end points to a UE 10. An MME/SAE GW 30 provides an end point of a session and mobility management function to the UE 10. The eNB 20 and the MME/SAE GW 30 may be connected to each other via an S1 interface.

In general, the eNB 20 is a fixed station communicating with the UE 10, also called a BS or an access point. One eNB 20 may be deployed in each cell. An interface for transmitting user traffic or control traffic may be used between eNBs 20.

An MME performs various functions for the eNB 20, including Non-Access Stratum (NAS) signaling, NAS signaling security, Access Stratum (AS) security control, inter-Core Network (inter-CN) node signaling (including control and implementation of paging retransmission) for mobility between 3GPP access networks, idle-mode UE reachability, tracking area list management (for UEs in idle mode and active mode), Packet Data Network GateWay (PDN GW) and serving GW selection, MME selection for handover accompanied by MME switching, selection of a Serving GPRS Support Node (SGSN) for handover to a 2G or 3G 3GPP access network, roaming, authentication, bearer management including dedicated bearer establishment, Public Warning System (PWS) (including Earthquake and Tsunami Warning System (ETWS) and Commercial Mobile Alert System (CMAS)), and support of message transmission.

An SAE GW host provides various functions including per-user packet filtering (e.g. using a deep packet check), lawful interception, UE IP address allocation, transport-level packet marking on DL, UL and DL service-level billing, gating and rate enhancement, and Access Point Name-Aggregated Maximum Bit Rate (APN-AMBR)-based DL rate enhancement.

The MME/SAE GW 30 is referred to simply as a 'GW'. However, the MME/SAE GW 30 includes both an MME and an SAE GW.

A plurality of nodes may be connected between the eNB 20 and the GW 30 via an SI interface. eNBs 20 may be interconnected via an X2 interface and adjacent eNBs may form a mesh network having an X2 interface.

Figure 2:
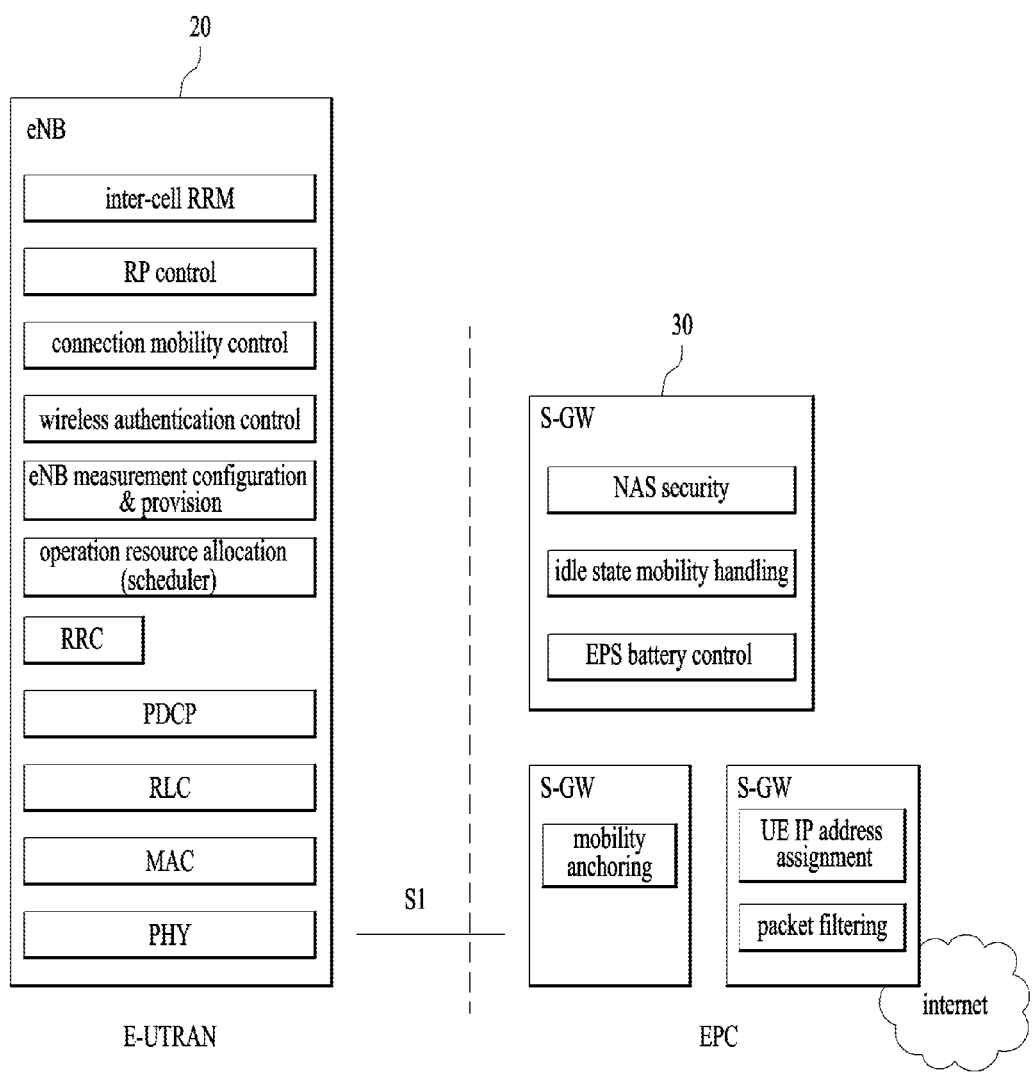
FIG. 2 is a block diagram for a general E-UMTS and a structure of a general gateway 30.

FIG. 2 is a block diagram of a general E-UTRAN and a general GW 30.

Referring to FIG. 2, the eNB 20 may perform functions such as selection of a GW 30, routing to the GW 30 during Radio Resource Control (RRC) activation, scheduling and transmission of a paging message, scheduling and transmission of Broadcast Control Channel (BCCH) information, dynamic DL and UL resource allocation to UEs 10, configuration and preparation of eNB measurement, radio bearer control, Radio Admission Control (RAC), and connection mobility control in LTE_ACTIVE state. In the EPC, the GW 30 may perform functions such as paging origination, LTE_IDLE state management, user-plane encryption, SAE bearer control, and cyphering and integrity protection for NAS signaling.

Figure 3:
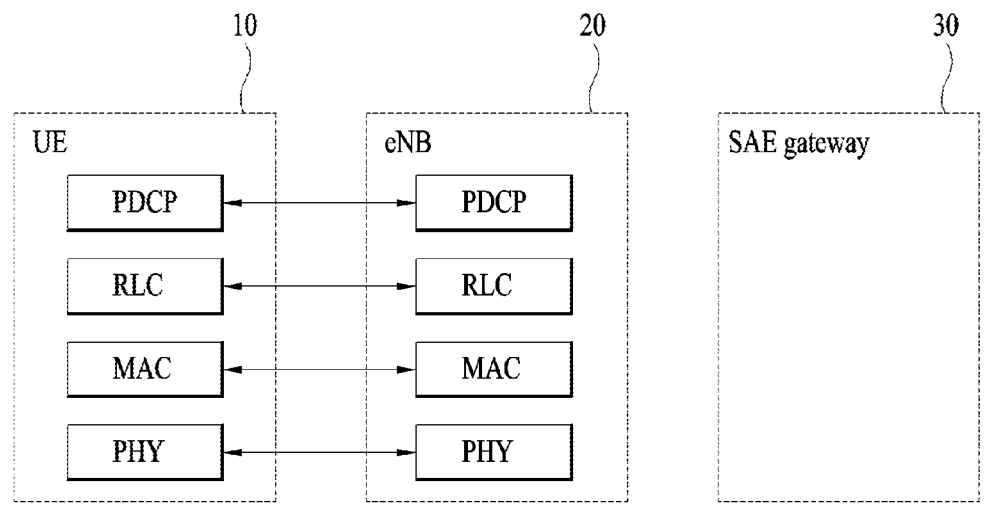
FIGS. 3 and 4 are block diagrams for a user-plane protocol stack and a control-plane protocol stack for an E-UMTS, respectively.
Figure 4:
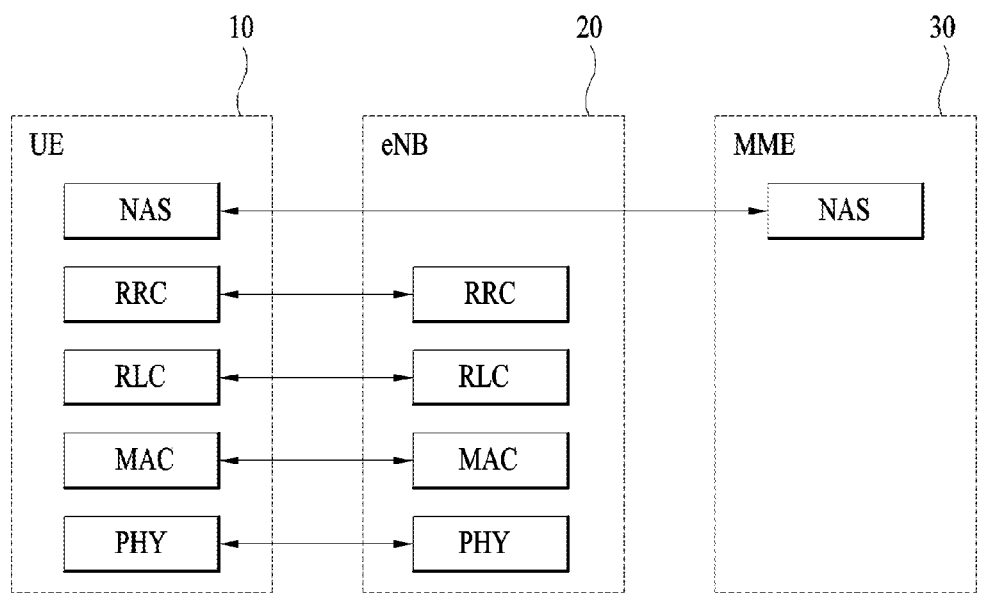

FIGS. 3 and 4 illustrate a user-plane protocol stack and a control-plane protocol stack for an E-UMTS.

Referring to FIGS. 3 and 4, protocol layers may be divided into Layer 1 (L1), Layer 2 (L2), and Layer 3 (L3) based on the lowest three layers of the Open System Interconnection (OSI) reference model known to the technical field of communication systems.

A PHYsical (PHY) layer, that is, L1 provides an information transfer service to a higher layer on physical channels. The PHY layer is connected to a Medium Access Control (MAC) layer above the PHY layer through transport channels and data is transmitted between the MAC layer and the PHY layer through the transport channels. Data is transmitted between different PHY layers such as the PHY layer of a transmitter and the PHY layer of a receiver on physical channels.

At L2, the MAC layer provides a service to its higher layer, Radio Link Control (RLC) through logical channels. The RLC layer of L2 supports reliable data transmission. While RLC layers are shown in FIGS. 3 and 4, if the MAC layer takes over RLC functionality, the RLC layer is not required.

A Packet Data Convergence Protocol (PDCP) layer of L2 performs a header compression function to reduce unnecessary control information. Thus, data may be efficiently transmitted in IP packets such as IP version 4 (IPv4) or IP version 6 (IPv6) packets via a radio interface having a relatively narrow bandwidth.

An RRC layer at the lowest part of L3 is defined only in the control plane and controls logical channels, transport channels, and physical channels in regards to configuration, reconfiguration, and release of Radio Bearers (RBs). An RB refers to a service provided by L2, for data transmission between the UE 10 and the E-UTRAN.

As illustrated in FIG. 3, the RLC layer and the MAC layer are terminated as the eNB 20 on the network side and may perform functions such as scheduling, Automatic Repeat reQuest (ARQ), and Hybrid ARQ (HARQ). The PDCP layer is terminated at the eNB 20 on the network side and may perform user-plane functions including header compression, integrity protection, and encryption.

Referring to FIG. 4, the RLC layer and the MAC layer are terminated at the eNB 20 on the network side and perform the same functions as control-plane functions. As illustrated in FIG. 4, the RRC layer is terminated at the eNB 20 on the network side and may control functions such as broadcasting, paging, RRC connection management, RB control, mobility, and measurement report and control of the UE 10. A NAS control protocol is terminated at an MME of the GW on the network side and may perform functions such as SAE bearer management, authentication, LTE_IDLE mobility handling, LTE_IDLE paging, and security control for signaling between the GW and the UE 10.

RRC states may be categorized into two different states, RRC_IDLE and RRC_CONNECTED.

In RRC_IDLE state, the UE 10 may receive broadcast system information and paging information during a Discontinuous Reception (DRX) cycle configured by the NAS. The UE 10 may be allocated an ID that uniquely identifies the UE 10 in a tracking area and may select or reselect a Public Land Mobile Network (PLMN). In the RRC_IDLE state, no RRC context is stored in an eNB.

In RRC_CONNECTED state, the UE 10 has an E-UTRAN connection and an RRC context used in the E-UTRAN and thus may transmit and/or receive data to and/or from the eNB. The UE 10 may also report channel quality information and feedback information to the eNB.

In the RRC_CONNECTED state, the E-UTRAN identifies a cell to which the UE 10 belongs. Therefore, the network may transmit and/or receive data to and/or from the UE 10, control UE mobility (handover and an order to change an inter-Radio Access Technology (inter-RAT) cell to a GSM EDGE Radio Access Network (GERAN) having a Network Assisted Cell Change (NACC)), and perform cell measurement on neighbor cells.

In the RRC_IDLE state, the UE 10 specifies a paging DRX cycle. Specifically, the UE 10 monitors a paging signal at a specific paging occasion in each specific paging DRX cycle.

1.2 Configuration Update Procedure and Handover Procedure

Figure 5:
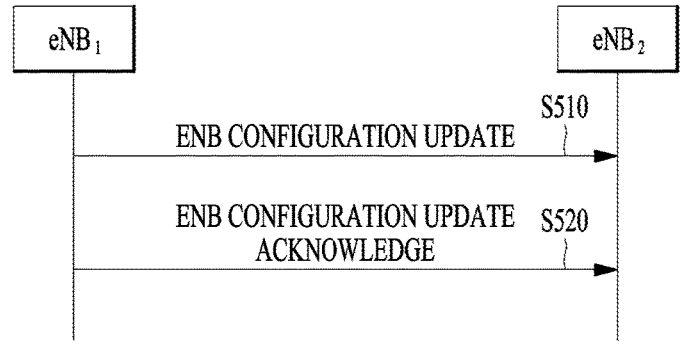
FIG. 5 is a flowchart for an example of a cell deployment status to which embodiments of the present invention are applicable.

FIG. 5 is a flowchart for an example of a configuration update procedure performed between eNBs in LTE system.

Two or more eNBs can perform an eNB configuration update procedure to update data of an application layer level which is necessary for precisely performing interoperation between two eNBs in X2 interface.

Referring to FIG. 5, a first eNB (i.e., an eNB 1) initiates the eNB configuration update procedure in a manner of transmitting an ENB CONFIGURATION UPDATE message to a second eNB (i.e., an eNB 2) corresponding to a peer eNB [S510].

In this case, an updated configuration data including a list of added, modified and/or deleted serving cells can be included in the ENB CONFIGURATION UPDATE message.

Having received the ENB CONFIGURATION UPDATE message, the second eNB updates information on the first eNB. Subsequently, after the requested information is successfully updated, the second eNB transmits an ENB CONFIGURATION UPDATE ACKNOWLEDGE message to the first eNB to indicate the successful update of the application data initiated by the first eNB [S520].

In this case, if the second eNB receives an ENB CONFIGURATION UPDATE message not including any IE except a message type information element, the second eNB transmits the ENB CONFIGURATION UPDATE ACKNOWLEDGE message to the first eNB without updating an existing configuration.

And, the first eNB can initiate an additional eNB configuration update procedure after a previous eNB configuration update procedure is completed.

Figure 6:
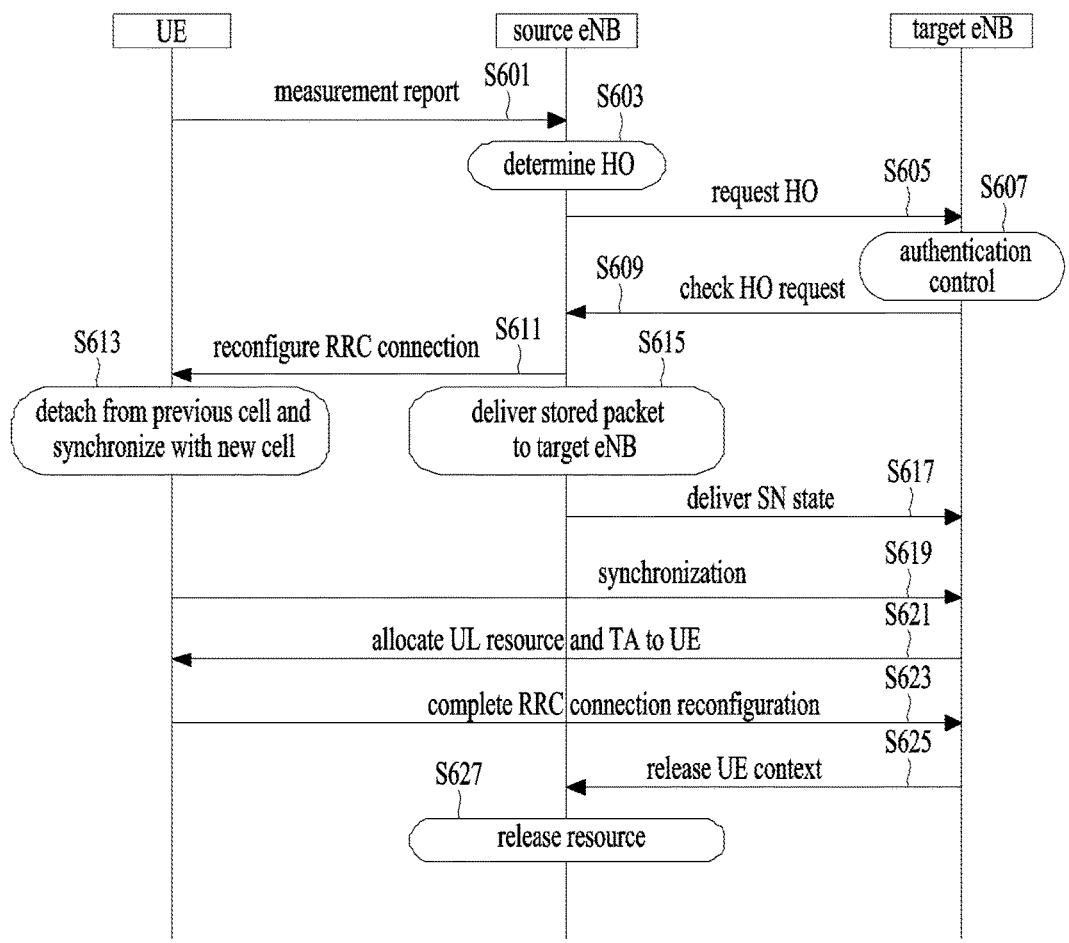
FIG. 6 is a flowchart for an example of a connection mode handover procedure in LTE system.

FIG. 6 is a flowchart for an example of a connection mode handover procedure in LTE system.

In FIG. 6, a network system can include a UE, a source eNB and a target eNB. In this case, the source eNB correspond to a serving eNB providing a scheduling service to the UE and the target eNB corresponds to a target eNB for which the UE intends to perform handover. And, the source eNB and the target eNB may correspond to a legacy eNB and a macro eNB, respectively.

A network controls a UE in RRC-CONNECTED state and a handover procedure is defined to manage mobility of the RRC_CONNECTED state. In general, the network triggers the handover procedure according to a radio channel condition and load. The handover procedure is shown in FIG. 6.

Referring to FIG. 6, the UE transmits a measurement report message including a measurement result of a neighbor cell to the source eNB [S601].

The source eNB can determine whether to perform handover and a target eNB to which the UE makes a handover. Subsequently, the source eNB can transmit a handover request message to the target eNB to perform the handover [S603, S605].

The target eNB controls authentication of the UE. if the UE is authenticated, the target eNB transmits a HO request acknowledge message to the serving eNB [S607, S609].

Having received the HO request acknowledge message, the source eNB transmits an RRC connection reconfiguration message to the UE to indicate a HO procedure to be performed [S611].

Having received the RRC connection reconfiguration message, the UE is detached from a legacy cell (i.e., the source eNB) and may be then able to perform a procedure of matching synchronization with a new cell (i.e., the target eNB) [S613, S615].

The source eNB firstly transmits a sequence number (SN) status delivery message to the target eNB to deliver buffered data or packet to the target eNB [S617].

Subsequently, the UE and the target eNB perform a synchronization procedure [S619] and the target eNB transmits uplink resource allocation information and timing advance (TA) information to the UE via a MAC (medium access control) message or an RRC message [S621].

The UE transmits an RRC connection reconfiguration completion message to the target eNB based on the uplink resource allocation information and the TA information [S623].

If the target eNB receives the RRC connection reconfiguration completion message from the UE, the target eNB transmits a UE context release message to the serving eNB to make a request for elimination of information related to the UE [S625].

Having received the UE context release message, the serving eNB releases a resource allocated to the UE and finishes the handover procedure [S627].

As mentioned in the foregoing description, FIG. 6 shows a legacy handover procedure performed by the UE. In particular, whenever an eNB providing a scheduling service to the UE changes, the UE should perform the handover procedure shown in FIG. 6.

Yet, when small cell environment is considered, many numbers of small cells can be deployed at a specific region (in particular, a cell region of a macro eNB). If the UE performs the handover procedure shown in FIG. 6 in the small cell environment, not only energy consumption of the UE and but also overhead on the network may considerably increase.

Therefore, it is necessary to deploy small cells configured to perform on/off of a dynamic cell in consideration of environment on which small cells are concentrated in the future. To this end, it is required to improve a current X2 interface procedure and it is necessary to optimize a current handover mechanism to reduce signaling overhead and latency. This is originated from an intimate characteristic of a small cell of which a covering area is not that big. The characteristic of the small cell may cause a frequent change of a cell (i.e., handover between small cells extremely close to each other).

2. Small Cell Environment

In embodiments of the present invention, a small cell can be explained by a combination of a DL resource (i.e., a component carrier) and a selective UL resource. A connection relation between a carrier frequency of a DL resource and a carrier frequency of a UL resource can be indicated by system information transmitted in the DL resource.

In this case, an object of the present invention is to make neighbor cells utilize information on small cells in a manner of delivering the information of the small cells of which an on/off state (hereinafter, 'on/off') is changing to the neighbor cells. Cell state change information can include identifier information of one or more small cells changing to an on/off state, on/off time information of small cells changing to the on/off state and on/off period information. And, the cell state change information can further include information (e.g., a cell identifier and the like) on a cell expanding or reducing coverage of the cell for a small cell when the small cell is turned on or tuned off.

Having received the cell state change information, the neighbor cells deliver the cell state change information to UEs belonging to the neighbor cells and can make the UEs not measure a cell switching to an off state anymore or can indicate the UEs to promptly measure a cell switching to an on state.

2.1 Small Cell Deployment Structure

Figure 7:
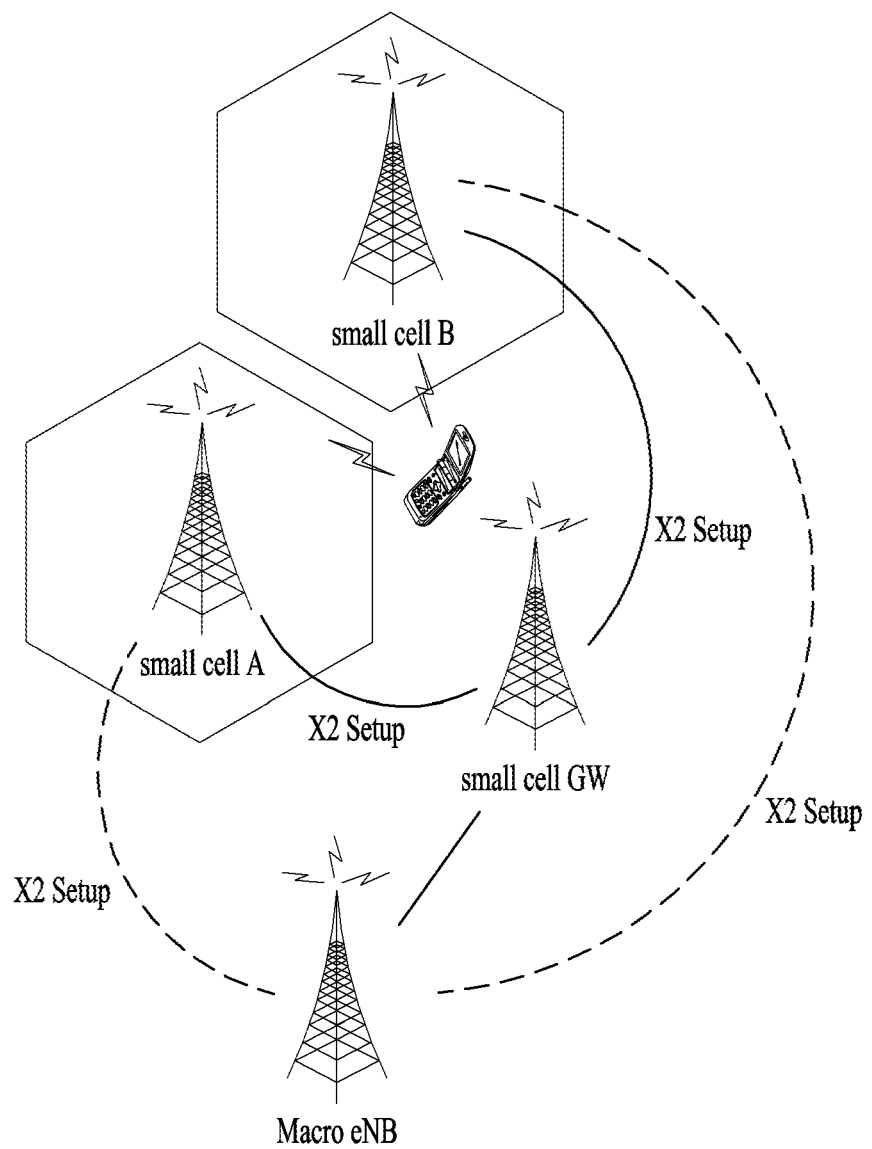
FIG. 7 is a diagram for an example of a cell deployment structure to which embodiments of the present invention are applicable.

FIG. 7 is a diagram for an example of a cell deployment structure to which embodiments of the present invention are applicable. In particular, FIG. 7 shows a cell deployment structure in case that a macro eNB controls an on/off procedure of a small cell.

Referring to FIG. 7, two or more small cells can be deployed at a region of a macro eNB. In the present invention, the macro eNB is used as a meaning identical to a macro cell. And, a macro cell region and a small cell gateway (S-GW) can be connected with each other via X2 interface.

FIG. 7 shows a scenario of a macro cell capable of controlling small cells in a manner that that macro cell and the small cells are interlocked with each other. The macro cell can manage whether a small cell is turned on or turned off and whether a cell area of a small cell expands or reduces. In this case, the macro cell may have a direct interface with small cells or may have an indirect interface via the S-GW.

Figure 8:
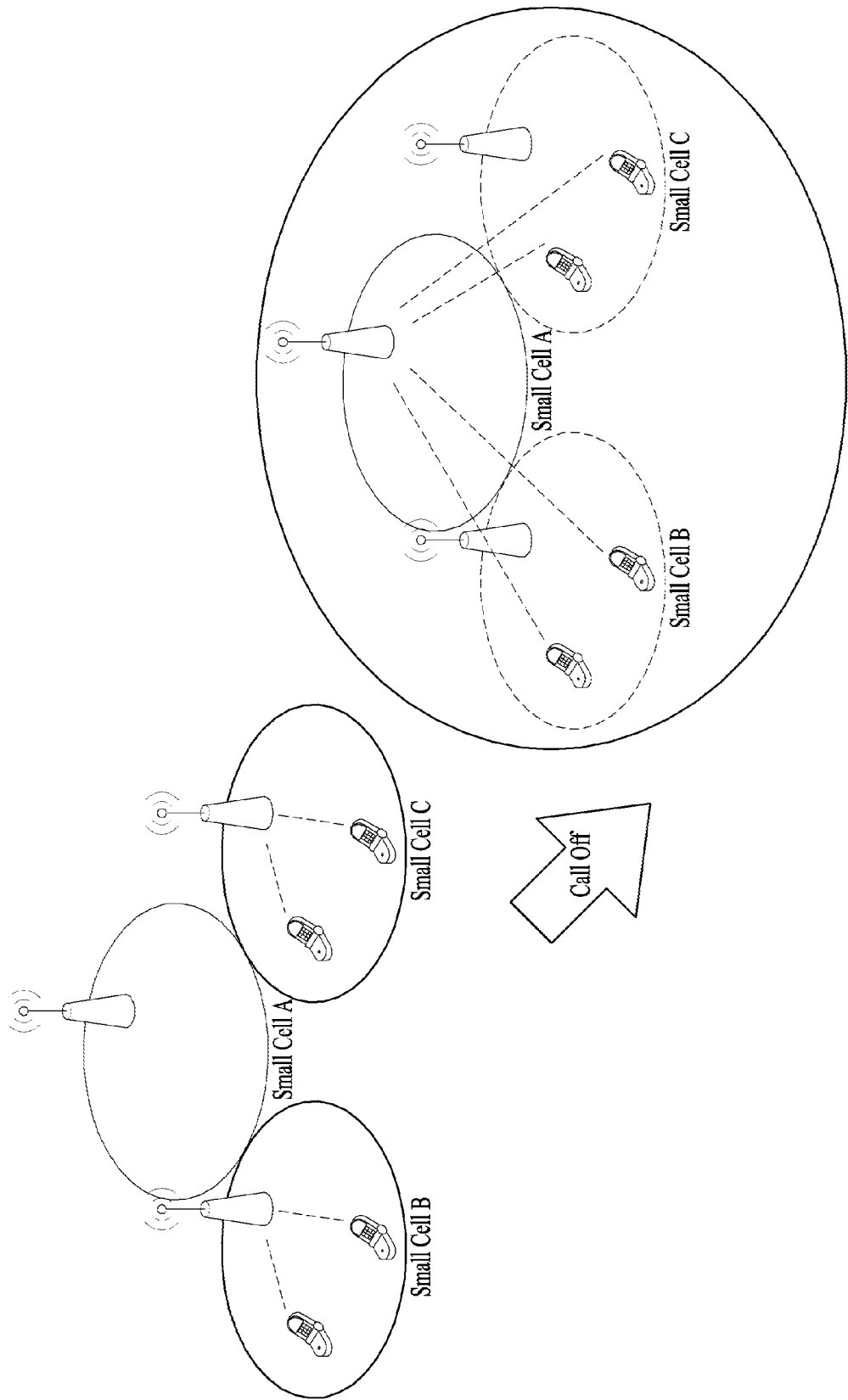
FIG. 8 is a diagram for a different example of a cell deployment structure to which embodiments of the present invention are applicable.

FIG. 8 is a diagram for a different example of a cell deployment structure to which embodiments of the present invention are applicable. In particular, FIG. 8 shows a network structure including small cells only.

Referring to FIG. 8, it is able to check three small cells including a small cell A, a small cell B and a small cell C. In this case, the small cell B and the small cell C are going to do cell off in a moment in consideration of network overhead, UE service provision state and the like. If the small cell B and the small cell C are off, a service provided to UEs currently connected with the small cell B and the small cell C may cause a problem. In this case, if the small cell A expands coverage of the small A as large as a region of the small cell B and a region of the small cell C, it is able to provide a seamless service to legacy UEs.

Subsequently, if it is necessary for the small cell B and/or the small cell C to provide a scheduling service in a legacy cell region of its own, the small cell B and/or the small cell C may tune on cell power again. In this case, the small cell A can reduce scheduling overhead and power consumption in a manner of reducing the expanded cell coverage.

Figure 9:
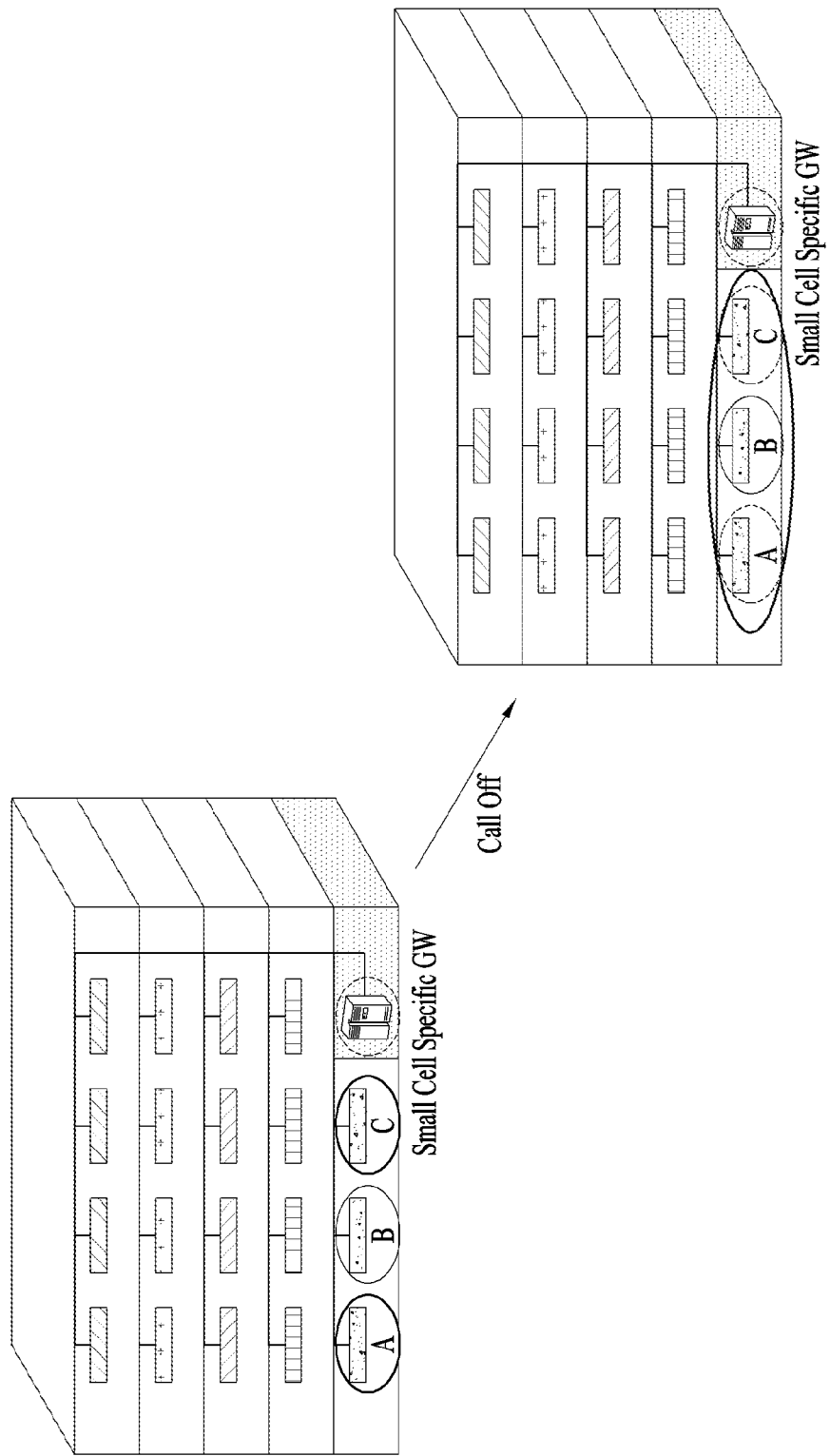
FIG. 9 is a diagram for a further different example of a cell deployment structure to which embodiments of the present invention are applicable.

FIG. 9 is a diagram for a further different example of a cell deployment structure to which embodiments of the present invention are applicable. In particular, FIG. 9 shows a scenario of an S-GW (small cell gateway) capable of controlling small cells in a manner that the S-GW and the small cells are interlocked with each other.

Referring to FIG. 9, a plurality of small cells can be installed in a specific building. In this case, the small cells can be managed by an S-GW. For example, in environment at which a small cell A, B and C are deployed, it may assume that the small cell A and the small cell C are turned off due to several reasons. In this case, cell regions used to be managed by the small cell A and C can be covered in a manner that the small cell B expands a cell region of the small cell B. In this case, the S-GW can manage whether a small cell is turned on or turned off and whether a cell area of a small cell expands or reduces.

In particular, the S-GW can control whether the small cell A and C are on/off and whether the cell region of the small cell B expands or reduces in consideration of a network situation.

2.2 Method of Managing on/Off Small Cell

In the embodiments of the present invention, a small cell configured to perform on or off of a cell is defined as an on/off small cell or a first cell. And, a cell located in the vicinity of the first cell is defined as a neighbor cell or a second cell. In this case, all types of cells may become the second cell. For example, the second cell may become a small cell, a pico cell, a micro cell or a macro cell. In case that the first cell performs on or off, a cell expanded or reduced to cover a cell region of the first cell can be defined as an expanded/reduced cell or a third cell. Assume that the third cell also has no limit in a cell type.

In the embodiments of the present invention, on/off performed by a small cell can be defined as follows.

(1) In case of providing (on) or not providing (off) a part of function among functions capable of being provided by a small cell (2) In case of restricting (off) all or a part of resource use (e.g., DL/UL resource) capable of being provided by a small cell or in case of releasing the restriction (on)

In the following, a method of managing an on/off small cell is explained in detail with reference to an attached drawing.

Figure 10:
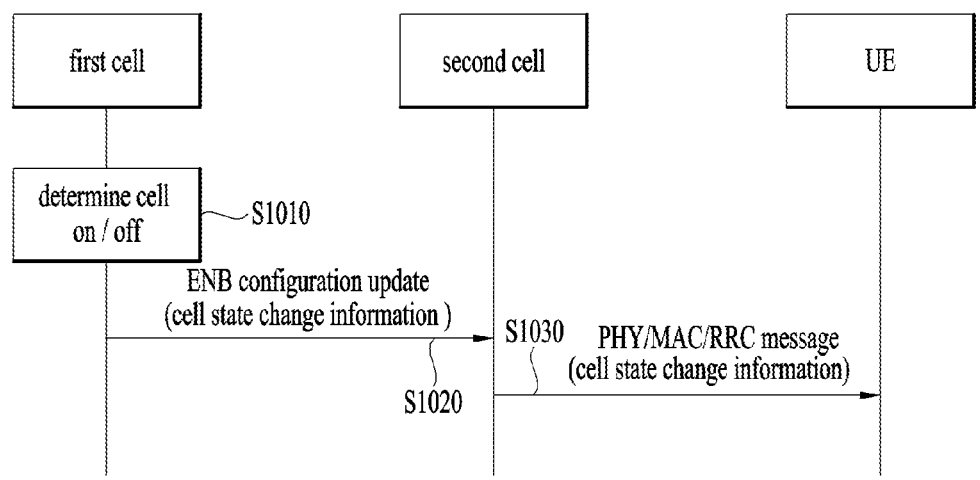
FIG. 10 is a flowchart for a method of managing an on/off small cell.

FIG. 10 is a flowchart for a method of managing an on/off small cell.

Assume that a cell deployment structure shown in FIG. 10 uses the small cell deployment structure mentioned earlier in FIG. 8. Referring to FIG. 10, a first cell can determine whether to turn on or turn off a cell in consideration of a load situation of the first cell or resource environment of the first cell [S1010].

Subsequently, the first cell can transmit a message including cell state change information to a neighboring second cell. In this case, as an example of the message including the cell state change information, it may use an ENB CONFIGURATION UPDATE message [S1020].

The cell state change information can include an identifier (e.g., PCI (physical cell identifier), ECGI (E-UTRAN cell identifier), etc.) of the first cell changing to on/off state, on/off time information indicating on/off time of the first cell, on/off timer information indicating a time interval in which on/off is performed and period information indicating a period on which on/off is performed.

And, the cell state change information can further include identifier information on a third cell, which reduces coverage of the third cell for the first cell, in case that the first cell is switched to an on state. Or, if the first cell is switched to an off state, the cell state change information can further include identifier information on the third cell, which expands the coverage of the third cell to cover coverage of the first cell.

In this case, whether the on/off state of the first cell is changed can be indicated in a manner of further including an on/off indicator indicating on or off of a cell in the cell state change information. Or, whether the on/off state of the first cell is changed can be indicated by a message type of the message including the cell state change information. For example, if a message type indicates cell on, information included in the message correspond to information related to on operation of a small cell.

Having received the cell state change information, the second cell can manage a list of on/off cells (i.e., first cell). For instance, for clarity of management, the second cell can separately manage an on list of on/off cells to be turned on and an off list of on/off cells to be turned off. In particular, if state change of on/off cells is classified into on and off, an additionally manageable attribute of the on/off cells is explicitly specified in a radio state for a cell and can be managed according to a cell. In addition, the second cell can also manage information (e.g., location information of the on/off cells, information on frequency used by the on/off cells) related to the on/off cells.

Referring back to FIG. 10, having received the cell state change information, the second cell can transmit the cell state change information to UEs belonging to a cell region of the second cell using a PHY message, a MAC message or an RRC message. For instance, in order to deliver the cell state change information to a UE, the second cell can transmit a system information block (SIB) message corresponding to the MAC message to the UE [S1030].

In particular, if on/off state of the first cell is changed, neighboring second cells update changed cell configuration information and inform UEs belonging to a region of the second cells of the updated cell configuration information. For instance, the second cell updates the aforementioned cell state change information and can transmit the updated cell state change information to the UEs.

In FIG. 10, having received the cell state change information, the second cells can control whether to perform a cell measurement procedure on the first cell for the UEs belonging to the second cells. For instance, if the cell state change information indicates that the first cell is turned off, the UEs may not perform the cell measurement procedure on the first cell, which is switched to the off state. Or, if the cell state change information indicates that the first cell is turned on, the UEs may be able to perform the cell measurement procedure on the first cell, which is switched to the on state. In this case, the cell measurement procedure can include not only simple RSRP and RSRQ measurement but also COMP measurement configured to receive data cooperative transmission transmitted by an eNB in terms of a UE.

More specifically, the cell state change information includes identifier information of the first cell, cell on/off time information, on/off timer information and on/off period information. Hence, a UE can identify an on/off cell using the identifier information and the UE may not perform the cell measurement procedure for a cell, which is turned off from time indicated by the cell on/off time information in a period indicated by the on/off period information during a time interval indicated by the on/off timer information. And the UE may be able to perform the cell measurement procedure for a cell which is turned on (not depicted).

Hence, if the first cell is turned off, the UE may not perform the cell measurement procedure on the first cell. Hence, it may be able to reduce battery consumption of the UE. And, if the first cell is turned on, the UE can promptly perform the cell measurement procedure on the first cell, thereby appropriately performing a cell selection or reselection procedure.

Although FIG. 10 shows a first cell and a single second cell adjacent to the first cell only, if there exist one or more neighbor cells, the first cell can deliver the cell state change information to all second cells.

Figure 11:
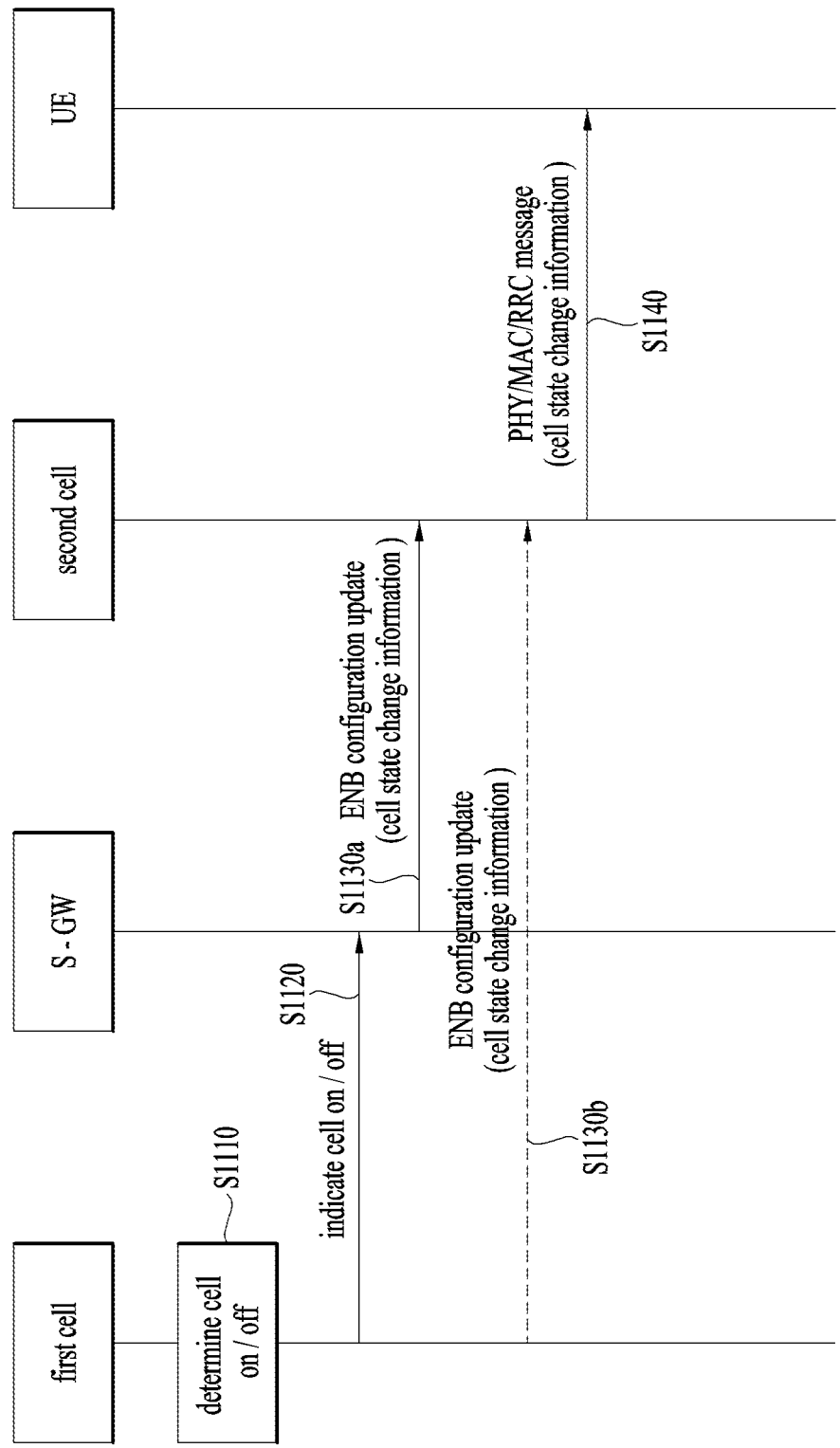
FIG. 11 is a flowchart for a different method of managing an on/off small cell.

FIG. 11 is a flowchart for a different method of managing an on/off small cell.

Assume that a cell deployment structure shown in FIG. 11 uses the small cell deployment structure mentioned earlier in FIG. 9. Referring to FIG. 11, a first cell can determine whether to turn on or turn off a cell in consideration of a load situation of the first cell or resource environment of the first cell [S1110].

Subsequently, the first cell transmits a cell on/off indication message indicating whether the first cell is turned on or turned off to an S-GW [S1120].

The S-GW receives the cell on/off indication message, checks whether small cells managed by the S-GW are turned on or turned off and may be then able to configure cell state change information. Hence, the S-GW can transmit a message including the cell state change information on one or more first cells to one or more neighboring second cells. In this case, as an example of the message including the cell state change information, it may use an ENB CONFIGURATION UPDATE message [S1130a]

Whether an on/off state of the first cell is changed is informed to the second cell by two steps such as the step S1120 and the step S1130a. This is because the S-SW is aware of information on all small cells managed by the S-GW. This is also because, since neighboring cells of a small cell and neighboring cells of the S-GW may be different from each other, it is more efficient to deliver information on whether the first cell is turned on or turned off by the S-GW, which is much more aware of a network situation.

The aforementioned cell state change information can include an identifier (e.g., a PCI (physical cell identifier), an ECGI (E-UTRAN cell identifier), etc.) of the first cell changing to on/off state, on/off time information indicating on/off time of the first cell, on/off timer information indicating a time interval in which on/off is performed and period information indicating a period on which on/off is performed.

And, the cell state change information can further include identifier information on a third cell, which reduces coverage of the third cell for the first cell, in case that the first cell is switched to an on state. Or, if the first cell is switched to an off state, the cell state change information can further include identifier information on the third cell, which expands the coverage of the third cell to cover coverage of the first cell.

In this case, whether the on/off state of the first cell is changed can be indicated in a manner of further including an on/off indicator indicating on or off of a cell in the cell state change information. Or, whether the on/off state of the first cell is changed can be indicated by a message type of the message including the cell state change information. For example, if a message type indicates cell on, information included in the message correspond to information related to on operation of a small cell.

Having received the cell state change information, the second cell can manage a list of on/off cells (i.e., first cell). For instance, for clarity of management, the second cell can separately manage an on list of on/off cells to be turned on and an off list of on/off cells to be turned off. In particular, if state change of on/off cells is classified into on and off, an additionally manageable attribute of the on/off cells is explicitly specified in a radio state for a cell and can be managed according to a cell. In addition, the second cell can also manage information (e.g., location information of the on/off cells, information on frequency used by the on/off cells) related to the on/off cells.

Referring back to FIG. 11, having received the cell state change information, the second cell can transmit the cell state change information to UEs belonging to a cell region of the second cell using a PHY message, a MAC message or an RRC message. For instance, in order to deliver the cell state change information to a UE, the second cell can transmit a system information block (SIB) message corresponding to the MAC message to the UE [S1140].

In particular, if on/off state of the first cell is changed, neighboring second cells update changed cell configuration information and inform UEs belonging to a region of the second cells of the updated cell configuration information. For instance, the second cell updates the aforementioned cell state change information and can transmit the updated cell state change information to the UEs.

In FIG. 11, having received the cell state change information, the second cells can control whether to perform a cell measurement procedure on the first cell for the UEs belonging to the second cells. For instance, if the cell state change information indicates that the first cell is turned off, the UEs may not perform the cell measurement procedure on the first cell, which is switched to the off state. Or, if the cell state change information indicates that the first cell is turned on, the UEs may be able to perform the cell measurement procedure on the first cell, which is switched to the on state.

More specifically, the cell state change information includes identifier information of the first cell, cell on/off time information, on/off timer information and on/off period information. Hence, a UE can identify an on/off cell using the identifier information and the UE may not perform the cell measurement procedure for a cell, which is turned off from time indicated by the cell on/off time information in a period indicated by the on/off period information during a time interval indicated by the on/off timer information. And the UE may be able to perform the cell measurement procedure for a cell which is turned on (not depicted).

Hence, if the first cell is turned off, the UE may not perform the cell measurement procedure on the first cell. Hence, it may be able to reduce battery consumption of the UE. And, if the first cell is turned on, the UE can promptly perform the cell measurement procedure on the first cell, thereby appropriately performing a cell selection or reselection procedure.

As a different aspect of FIG. 11, the first cell determines whether to turn on/off a cell in the step S1110 and can transmit the message including the cell state change information to the second cell. In this case, the second cell more clearly identify existence of small cells turned on/off in the vicinity of the second cell in a manner of combining the cell state change information received from the S-GW and the cell state change information received from the first cell with each other.

Although FIG. 11 shows a first cell and a single second cell adjacent to the first cell only, if there exist one or more neighbor cells, the first cell can deliver the cell state change information to all second cells.

Figure 12:
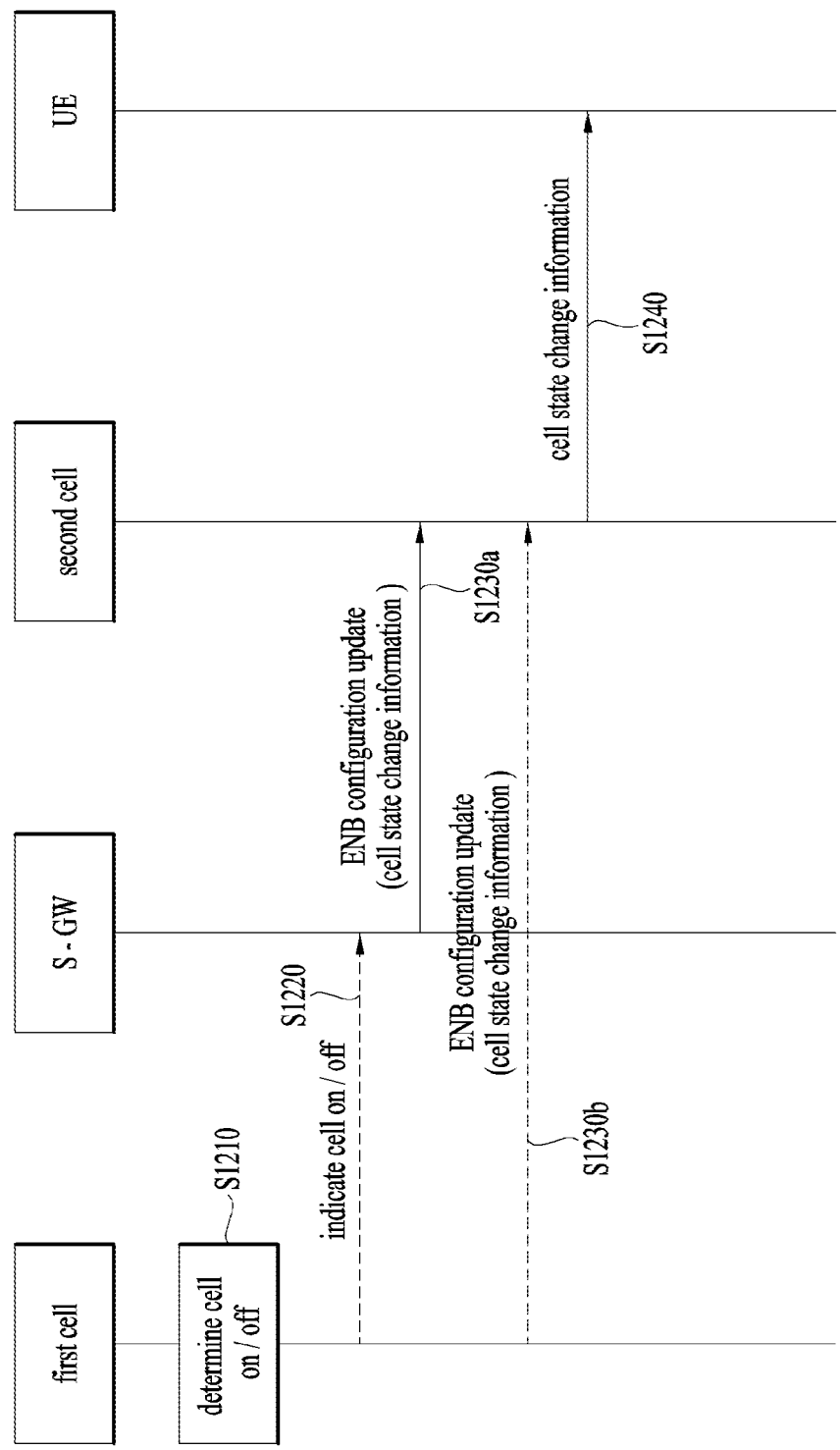
FIG. 12 is a flowchart for a further different method of managing an on/off small cell.

FIG. 12 is a flowchart for a further different method of managing an on/off small cell.

Assume that a cell deployment structure shown in FIG. 12 uses the small cell deployment structure mentioned earlier in FIG. 7. Referring to FIG. 12, a first cell can determine whether to turn on or turn off a cell in consideration of a load situation of the first cell or resource environment of the first cell [S1210].

Subsequently, the first cell transmits a cell on/off indication message indicating whether the first cell is turned on or turned off to a macro cell [S1220].

The macro cell receives the cell on/off indication message, checks whether small cells managed by the macro cell are turned on or turned off and may be then able to configure cell state change information. Hence, the macro cell can transmit a message including the cell state change information on one or more first cells to one or more neighboring second cells. In this case, as an example of the message including the cell state change information, it may use an ENB CONFIGURATION UPDATE message [S1230a].

Whether an on/off state of the first cell is changed is informed to the second cell by two steps such as the step S1220 and the step S1230a. This is because the macro cell is aware of information on all small cells managed by the macro cell. This is also because, since neighboring cells of a small cell and neighboring cells of the macro cell may be different from each other, it is more efficient to deliver information on whether the first cell is turned on or turned off by the macro cell, which is much more aware of a network situation.

In the following, configuration of the cell state change information, explanation on the step S1230b and the step 1240 are identical to what is mentioned earlier in FIG. 11. Hence, explanation on the corresponding contents can be replaced with the contents of FIG. 11.

3. Apparatuses

Figure 13:
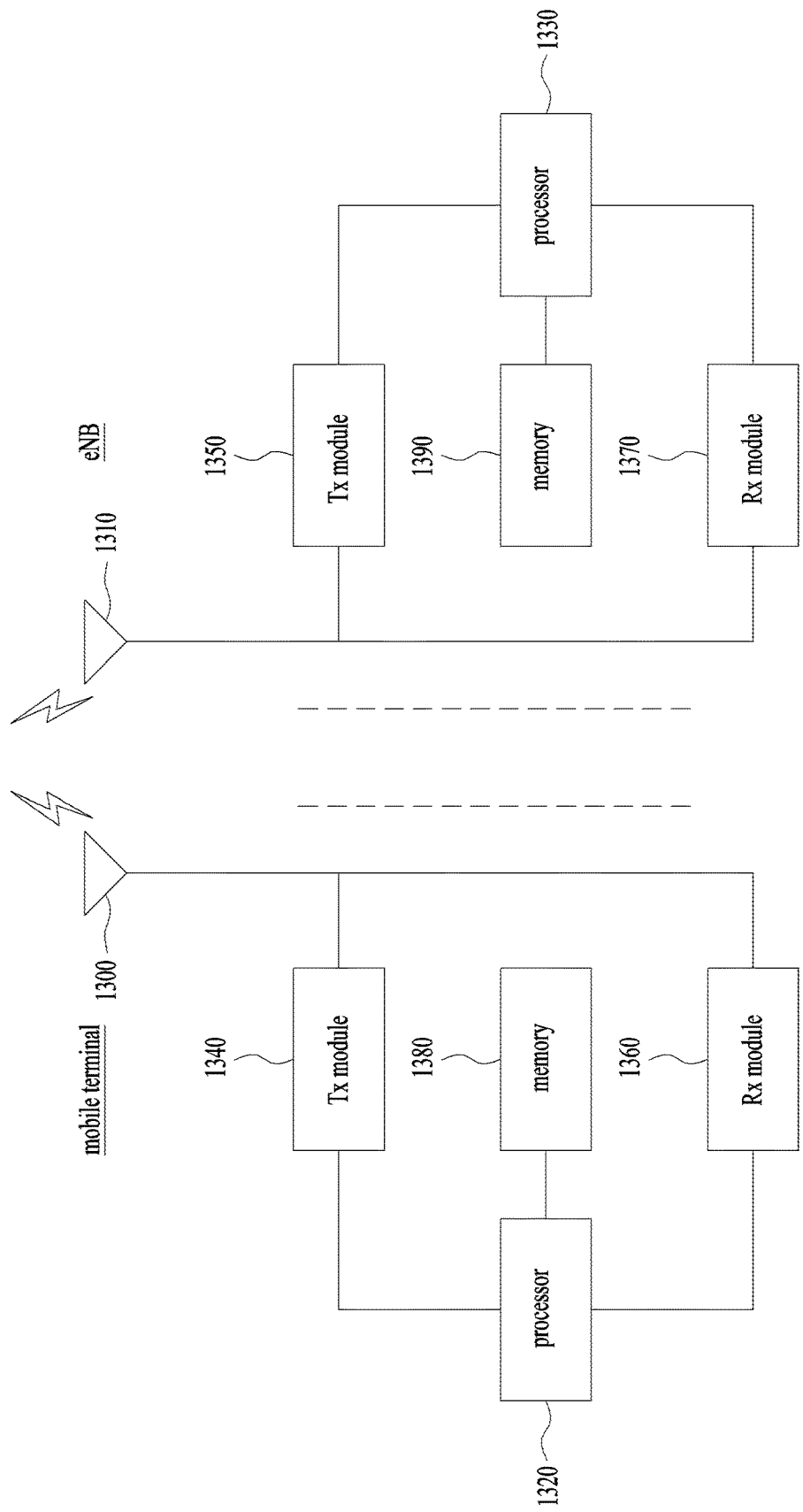
FIG. 13 is a diagram for apparatuses capable of implementing contents mentioned in FIG. 1 to FIG. 12.

Apparatuses illustrated in FIG. 13 are means that can implement the methods described before with reference to FIGS. 1 to 12.

A UE may act as a transmitter on a UL and as a receiver on a DL. An eNB may act as a receiver on a UL and as a transmitter on a DL.

That is, each of the UE and the eNB may include a Transmission (Tx) module 1340 or 1350 and a Reception (Rx) module 1360 or 1370, for controlling transmission and reception of information, data, and/or messages, and an antenna 1300 or 1310 for transmitting and receiving information, data, and/or messages.

Each of the UE and the eNB may further include a processor 1320 or 1330 for implementing the afore-described embodiments of the present disclosure and a memory 1380 or 1390 for temporarily or permanently storing operations of the processor 1320 or 1330.

The embodiments of the present invention can be performed using a configuration component and functions of the aforementioned UE and the eNB. For instance, if a first eNB manages a first cell, a processor of the first eNB determines whether to turn on/off a cell and may be able to transmit related information to an S-GW or a macro eNB. Or, the first eNB configures cell state change information and may be able to transmit a message including the cell state change information to a peer eNB.

A drawing explained in FIG. 13 can also be used for communication between eNBs. For instance, a processor of a second eNB controls a reception module to receive cell state change information from an S-GW or a macro eNB. And, the processor of the second eNB controls a transmission module to deliver the cell state change information to a UE. It may refer to drawings mentioned earlier in FIG. 10 to FIG. 12 for more detail embodiments.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 13 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi-Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1380 or 1390 and executed by the processor 1320 or 1330. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for managing information on an on/off small cell in a wireless access system supporting a small cell, the method comprising:
   receiving, by a second cell, a first message including cell state change information on a first cell corresponding to a small cell changing to an on state or an off state; and
   transmitting, by the second cell to a user equipment (UE), a second message including the cell state change information,
   wherein the cell state change information comprises:
      identifier information on the first cell,
      on/off time information indicating a time for changing to the on state or the off state,
      on/off timer information indicating a time interval of changing to the on state or the off state, and
      identifier information on a third cell that reduces or expands coverage of the third cell as the first cell changes to the on state or the off state,
   wherein the on state corresponds to a state where first cell functions are provided by the first cell and the off state corresponds to a state where the first cell functions are not provided by the first cell.

2. The method of claim 1, wherein the second message corresponds to either a MAC (medium access control) message or an RRC (radio resource control) message.

3. A method for managing information on an on/off small cell in a wireless access system supporting a small cell, the method performed by a user equipment (UE) and comprising:
   receiving, from a second cell, a first message including cell state change information on a first cell corresponding to a small cell changing to an on state or an off state; and
   determining whether to perform a channel measurement procedure on the first cell based on the cell state change information,
   wherein, if the cell state change information indicates that the first cell is turned off, the UE is configured not to perform the channel measurement procedure on the first cell,
   wherein, if the cell state change information indicates that the first cell is turned on, the UE is configured to perform the channel measurement procedure on the first cell,
   wherein the cell state change information comprises:
      identifier information on the first cell,
      on/off time information indicating a time for changing to the on state or the off state,
      on/off timer information indicating a time interval of changing to the on state or the off state, and
      identifier information on a third cell that reduces or expands coverage of the third cell as the first cell changes to the on state or the off state, and
   wherein the on state corresponds to a state where first cell functions are provided by the first cell and the off state corresponds to a state where the first cell functions are not provided by the first cell.

4. The method of claim 3, wherein the second message corresponds to either a MAC (medium access control) message or an RRC (radio resource control) message.

5. A second eNB for managing information on an on/off small cell in a wireless access system supporting a small cell, the second eNB comprising:
   a transmitter;
   a receiver; and
   a processor configured to manage the information on the on/off small cell,
   wherein the processor is configured to:
   control the receiver to receive a first message including cell state change information on a first cell corresponding to a small cell changing to an on state or an off state,
   control the transmitter to transmit a second message including the cell state change information to a UE, wherein the cell state change information comprises:
identifier information on the first cell,
on/off time information indicating a time for changing to the on state or the off state,
on/off timer information indicating a time interval of changing to the on state or the off state, and
identifier information on a third cell that reduces or expands coverage of the third cell as the first cell changes to the on state or the off state,
wherein the on state means providing functions capable of being provided by the first cell and the off state means not providing functions capable of being provided by the first cell.

6. A user equipment (UE) for managing information on an on/off small cell in a wireless access system supporting a small cell, the UE comprising:
a transmitter;
a receiver; and
a processor configured to manage information on the on/off small cell,
wherein the processor is configured to:
control the receiver to receive a first message containing cell state change information on a first cell corresponding to a small cell changing to an on state or an off state from a second cell, and
determine whether to perform a channel measurement procedure on the first cell based on the cell state change information,
wherein, if the cell state change information indicates that the first cell is turned off, the processor is configured not to perform the channel measurement procedure on the first cell,
wherein, if the cell state change information indicates that the first cell is turned on, the processor is configured to perform the channel measurement procedure on the first cell,
wherein the cell state change information comprises:
identifier information on the first cell,
on/off time information indicating a time for changing to the on state or the off state,
on/off timer information indicating a time interval of changing to the on state or the off state, and
identifier information on a third cell that reduces or expands coverage of the third cell as the first cell changes to the on state or the off state, and
wherein the on state means providing functions capable of being provided by the first cell and the off state means not providing functions capable of being provided by the first cell.

* * * * *